J. W. STRATTON.
GOPHER TRAP.
APPLICATION FILED MAR. 7, 1917.

1,230,054.  Patented June 12, 1917.

Inventor

J. W. STRATTON

By N. S. Hill

Attorney

UNITED STATES PATENT OFFICE.

JOHN W. STRATTON, OF LINN, KANSAS.

GOPHER-TRAP.

1,230,054.
Specification of Letters Patent.
Patented June 12, 1917.

Application filed March 7, 1917. Serial No. 153,057.

*To all whom it may concern:*

Be it known that I, JOHN W. STRATTON, a citizen of the United States, residing at Linn, in the county of Washington, State of Kansas, have invented a new and useful Gopher-Trap; and I do hereby declare the following to be a full, clear, and exact description of the invention, such as will enable others skilled in the art to which it appertains to make and use the same.

The present invention relates to certain new and useful improvements in the construction of animal traps, and has for its object to provide a device of this kind which embodies novel features of construction whereby it can be used in a most effective manner for catching burrowing animals, such as gophers.

Further objects of the invention are to provide a gopher trap which is comparatively simple and inexpensive in its construction, which can be easily carried from place to place and set in operative position at the mouth of a burrow, and which will get the gopher even though it may spring the trap by packing earth against the trigger.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
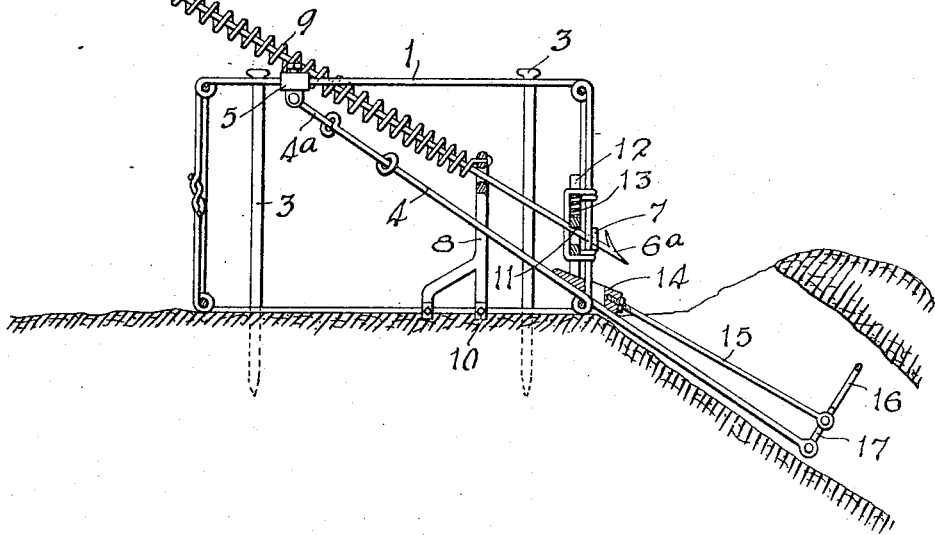
Figure 1 is a vertical longitudinal sectional view through the gopher trap, taken on the line $x$—$x$ of Fig. 2.
Figure 2:
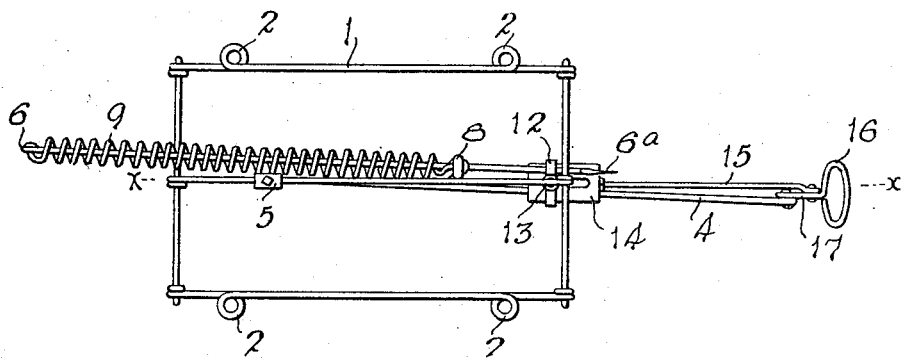
Fig. 2 is a top plan view of the gopher trap.

Referring to the drawings, which illustrate one embodiment of the invention, the numeral 1 designates a main frame which may be formed of wire or other suitable material and is designed to be placed upon the surface of the ground at the entrance of the burrow. This frame is shown as having an elongated rectangular shape, and as being provided upon opposite sides thereof with laterally projecting loops 2 for engagement with stakes 3, by means of which the frame is held securely in operative position. An inclined trigger supporting arm 4 extends diagonally through the main frame 1 and projects downwardly from one of the lower corners of the main frame, being adapted to be inserted into the mouth of the burrow. If desired, this arm 4 can be constructed in such a manner as to admit of the inclination thereof being adjusted so that it can be varied to suit the particular burrow. For this purpose the upper end of the arm may be provided with an extension $4^a$ which is adjustably connected by a set collar 5 to the main frame. With this construction it will be obvious that by shifting the position of the set collar the inclination of the trigger supporting arm can be adjusted as desired.

A spring actuated dart 6 is mounted upon the frame 1 and inclined in the same direction as the arm 4, said dart having the lower end thereof barbed at $6^a$, and being slidable through a guide 7 on the frame 1. A guide arm 8 also engages the dart 6 at a point spaced from the guide opening 7, and a tension spring 9 which surrounds the dart has one end thereof secured to the guide arm 8, while the opposite end thereof is secured to the upper end of the dart. This guide arm 8 may be adjustable and arranged to move longitudinally of the frame, thereby enabling the inclination of the dart to be varied for the purpose of accurately pointing it in the proper direction. A set collar 10 may be utilized for holding the guide arm in an adjusted position.

A notch 11 is formed in the dart 6 at a point adjacent to the barbed end $6^a$ thereof, said notch being adapted to be engaged by a vertically movable sliding detent 12 to hold the dart against the action of the spring. In the present instance this detent 12 is shown as formed with an opening through which the dart passes, the upper edge of the opening normally engaging the notch 11, and a spring 13 being arranged at the top of the detent for holding it yieldably in operative position. A wedge 14 is arranged under the lower end of the detent, said wedge being carried by the rear end of a plunger 15 which is connected to a looped trigger 16. An arm 17 which projects downwardly from the looped trigger 16 is pivotally connected to the lower end of the trigger supporting arm 4.

When the trap is set the main frame 1 is held securely in position by the stakes 3 with the trigger supporting arm 4 extending downwardly a short distance into the mouth of the burrow, the dart 6 being retracted against the action of the spring 9 and held in a retracted position by the detent 12. When the gopher attempts to leave the burrow, it may either press against the trigger 16, or remain in the burrow and pack dirt against the trigger. In either instance the trigger will be sprung forwardly and the detent 12 lifted by the wedge 14 a sufficient amount to release the dart 6. The gopher will then be impaled upon the barbed end of the dart, and the subterfuge of packing dirt against the trigger will not prevent it from being caught by the trap.

Having thus described the invention, what I claim as new and desire to secure by Letters Patent, is:—

1. A trap for burrowing animals, including a frame, a trigger supporting arm projecting from the frame and adapted to be inserted in the mouth of a burrow, a spring actuated dart mounted upon the frame and arranged to be projected into the burrow, a sliding detent for holding the dart against the action of the spring, a trigger mounted upon the trigger supporting arm, a wedge at one end of the sliding detent, and an operative connection between the wedge and the trigger.

2. A trap for burrowing animals, including a frame, a trigger supporting arm projecting from the frame and adapted to be inserted into the mouth of a burrow, a spring actuated dart mounted upon the frame and arranged to be projected into the burrow, a sliding detent for holding the dart against the action of the spring, a wedge at one end of the sliding detent, a swinging trigger pivotally mounted at the end of the trigger supporting arm, and a plunger connected to the swinging trigger and carrying the before mentioned wedge.

3. A trap for burrowing animals, including a frame, an inclined trigger supporting arm projecting downwardly therefrom and adapted to be inserted in the mouth of a burrow, means for adjusting the inclination of the trigger supporting arm, a spring actuated dart mounted upon the frame and arranged to be projected into the burrow, adjustable guide means for varying the inclination of the dart and directing it in its movements, a detent for holding the dart against the action of the spring, and a trigger mounted upon the end of the trigger supporting arm and having an operative connection with the detent.

4. A trap for burrowing animals, including a frame, an inclined trigger supporting arm projecting downwardly from the frame and adapted to be inserted into the mouth of a burrow, said arm being provided at its upper end with an extension which adjustably engages the frame to admit of the inclination of the arm being adjusted, a spring actuated dart mounted upon the frame and arranged to be projected into the mouth of the burrow, a guide for the dart upon the frame, a second adjustable guide engaging the dart and movable to vary the inclination thereof, a detent for holding the dart against the action of the spring, a swinging trigger pivotally mounted upon the lower end of the trigger supporting arm, a plunger connected to the swinging trigger, and a wedge carried by the plunger and operatively engaging the detent.

In testimony whereof I have signed my name to this specification in the presence of two subscribing witnesses.

JOHN W. STRATTON.

Witnesses:
W. G. ADAMS,
E. G. SACKETT.

Copies of this patent may be obtained for five cents each, by addressing the "Commissioner of Patents, Washington, D. C."